(12) United States Patent
Diniaco (10) Patent No.: US 9,481,512 B2
(45) Date of Patent: Nov. 1, 2016

(54) MODULAR CONSTRUCTION SUPPLY MATERIALS CONTAINER SYSTEM AND METHOD OF PROVIDING SAME

(76) Inventor: Steven Diniaco, Woodlands, TX (US)

( * ) Notice: Subject to any disclaimer, the term of this patent is extended or adjusted under 35 U.S.C. 154(b) by 284 days.

(21) Appl. No.: 13/315,080

(22) Filed: Dec. 8, 2011

(65) Prior Publication Data

US 2012/0321436 A1    Dec. 20, 2012

Related U.S. Application Data

(60) Provisional application No. 61/420,933, filed on Dec. 8, 2010.

(51) Int. Cl.
*B60P 1/64* (2006.01)
*B60P 7/13* (2006.01)
*B65D 90/00* (2006.01)
*B65D 90/22* (2006.01)

(52) U.S. Cl.
CPC ......... *B65D 90/0073* (2013.01); *B60P 1/6481* (2013.01); *B60P 7/13* (2013.01); *B65D 90/22* (2013.01); *B65D 2211/00* (2013.01); *B65D 2590/0083* (2013.01)

(58) Field of Classification Search
CPC ........................... B60P 1/6418; B60P 1/6481
USPC ............................................. 296/24.3, 24.44
See application file for complete search history.

(56) References Cited

U.S. PATENT DOCUMENTS

| | | | | |
|---|---|---|---|---|
| 2,574,483 | A * | 11/1951 | Jack | 296/3 |
| 2,733,095 | A * | 1/1956 | Crivella | 296/26.14 |
| 3,561,621 | A * | 2/1971 | Rivers, Jr. | 414/537 |
| 4,078,818 | A * | 3/1978 | Donnelly | 280/418.1 |
| 4,516,308 | A * | 5/1985 | Urban | 29/564 |
| 4,643,476 | A * | 2/1987 | Montgerard | 296/24.32 |
| 4,826,474 | A * | 5/1989 | Holmes | 414/699 |
| 5,192,176 | A * | 3/1993 | Roberts | 410/140 |
| 5,383,698 | A * | 1/1995 | Buchholz | 296/26.03 |
| 5,447,407 | A * | 9/1995 | Weaver et al. | 414/528 |
| 6,270,137 | B1 * | 8/2001 | Minix et al. | 296/24.3 |
| 6,547,506 | B1 * | 4/2003 | Jacob | 414/498 |
| 6,705,136 | B2 * | 3/2004 | Porter | 70/210 |
| 6,969,102 | B2 * | 11/2005 | Orischak et al. | 296/24.32 |
| 7,114,754 | B2 * | 10/2006 | Morello | 296/24.32 |
| 7,411,495 | B2 * | 8/2008 | Auerbach et al. | 340/539.26 |
| 8,061,395 | B1 * | 11/2011 | Atkinson | 144/285 |
| 8,162,371 | B2 * | 4/2012 | Heuvelman | 296/37.6 |
| 8,632,292 | B2 * | 1/2014 | Brown | 414/486 |
| 2006/0186730 | A1 * | 8/2006 | Coutermarsh et al. | 303/89 |
| 2009/0217718 | A1 * | 9/2009 | Porter | 70/271 |
| 2009/0256375 | A1 * | 10/2009 | Haskins | 296/24.32 |
| 2010/0036707 | A1 * | 2/2010 | Gilchrist | 705/9 |
| 2010/0074723 | A1 * | 3/2010 | Lancon | 414/800 |

(Continued)

FOREIGN PATENT DOCUMENTS

DE    1276465 B  *  8/1968  ............ B60P 1/6418

*Primary Examiner* — James Keenan
(74) *Attorney, Agent, or Firm* — McNair Law Firm, P.A.; Douglas W. Kim (57) ABSTRACT

The present invention is a system for transporting and storing construction materials for a job site using a trailer having a plurality of openings, a container having a frame carrying support feet for being received into the trailer openings, a plurality of attachment points carried by the frame on the floor of the interior of the container, a plurality of shelves carried by the interior of the container; and a door carried by the container having a lock.

11 Claims, 9 Drawing Sheets

(56) References Cited

U.S. PATENT DOCUMENTS

2010/0191615 A1* 7/2010 Thomas .................. B61D 3/20
705/26.1

2012/0012588 A1* 1/2012 Shield et al. ................. 220/315
2012/0104785 A1* 5/2012 Hixson et al. ............. 296/24.36

* cited by examiner

MODULAR CONSTRUCTION SUPPLY MATERIALS CONTAINER SYSTEM AND METHOD OF PROVIDING SAME

CROSS-REFERENCE TO RELATED APPLICATIONS

The application claims the benefit of U.S. Provisional Patent Application Ser. No. 61/420,933 filed Dec. 8, 2010 titled Modular Construction Supply Materials Container System.

BACKGROUND OF THE INVENTION

1. Field of the Invention

This invention is directed to a container adapted for the construction industry and more specifically, a container system that provides modular containers preloaded with construction materials for easy placement at construction sites to increase efficiencies in construction.

2. Description of Related Art

In the manufacturing industry, there are several common materials that are needed consistently from job site to job site. Such materials include lumber, pre-fabricated door and windows, bath tubs and showers, moulding, millwork, columns, paneling, pipes, conduits wiring and the like. Further, there are also predetermined sizes and shapes that are used consistently from site to site.

Traditionally, these materials are shipped to the job site through a variety of means that include shipping directly from vendors, from central distribution locations, and using a variety of transportation means. One problem associated with the traditional methods is that supplies arrive on the job site at different times and sometimes in inaccurate quantities. This is principally due to the fact the typically the industry orders supplies in bulk and distributes portion of these materials to different job sites. Alternatively, the goods are purchased at wholesale (or retail) home improvement stores such as Home Depot an Lowes where the goods are also pre-cut, packaged, quantized, etc. These problems lead to delays in construction costing time and money.

If goods arrive at the job site at different time and need on site processing, further delays can be realized. For example, if the framing is completed, then drywall should be waiting for installation. Once drywall is installed, moulding can be installed. This order of installation depends upon the supplies arriving in an organized and timely fashion requiring logistics and supply management. Further, workers that sit idle waiting for supplies is a needless waste of money and time since such workers are generally paid hourly. Even if salaried, productivity suffers.

One attempt has been made to improve on the process is shown in U.S. Pat. No. 7,114,754 titled Mobile Construction Support Vehicle and discloses a vehicle for use in construction to support steel building fabrication. This reference discuses a trailer and a mobile unit containing enough equipment to handle most tasks used on a construction site for metal building construction. The trailer has its own self-contained power and is fully supportive of a mobile metal building factory. However, this reference in too narrowly applicable to the metal building manufacturing process.

U.S. Pat. No. 4,516,308 is titled Portable Workshop and describes a portable workshop having various facilities for performing precision machine work at a work site and which includes a mobile trailer having first and second sections with transport wheel and suspension assemblies and a trailer hitch whereby the trailer may be easily towed from one work site to another. One section is separable from the other and the transport wheels remain with one platform while smaller wheels are provided on the other platform with elevating mechanism to lower the platform onto the smaller wheels. One platform may have equipment such as a welder which might be separated and used on one location at the job site while the other section has various tools, including a crane and a container for storing the tools, which might be moved to and utilized at another location at the site. However, this invention is not well suited to general construction and most definitely not well suited to working or plumbing.

U.S. Pat. No. 6,969,102 is titled Mobile Design And Fabrication Studio and describes a mobile studio for designing and/or fabricating corrugated paperboard products includes a cutting table disposed in the enclosure for cutting and scoring sheets of corrugated paperboard. A computer is also disposed in the enclosure for designing the product and controlling the cutting table. The studio may be transported to a customer's location to design and fabricate a prototypical corrugated paperboard product (e.g. POP displays and packaging) on-site. However, this invention is not well suited to the building construction industry.

Once practical factor that is delayed and "just in time" delivery of supplies is desirable due to the risk of theft and other causes of materials loss. Generally theft is a concern and supplies sitting around for an extended period of time increase the risk of loss. When supplies are exposed to weather for too long a period, the material can degrade and ultimately become unusable. Further, storage of such supplies can be problematic due to some construction sites having limited work space.

Further, traditional construction material delivery utilizes two people (a driver and a helper) and average two deliveries per dispatch. Therefore, there is a need to reduce delivery cost and reduce the impact on the environment by reducing fuel costs, emissions, equipment wear and tear, etc.

It would be advantageous if there were a construction supply delivery system that reduces or eliminates the need for supply delivery logistics management by providing multiple types of supplies in a single delivery where the supplies are organized and ordered according to the construction process and timeline. It would also be advantageous to have a delivery system that can deliver to multiple job sites and provides security to prevent theft of the construction materials.

Therefore, it is an object of this invention to provide for a construction supply materials container system that can deliver construction materials to a job site in order of the construction timeline and process.

It is another object of this invention to provide a system and method that will allow for the delivery of like supplies to multiple construction sites without having to return to a central location.

It is another objet of the present invention to provide a secure container to reduce the risk of loss through theft, vandalism or other undesirable activities.

SUMMARY OF THE INVENTION

The objectives of this invention are accomplished by providing a system for transporting, storing and securing construction materials for use at a job site comprising: a tractor trailer having a tractor trailer bed having a plurality of openings for receiving support feet of a container; the container having a frame, sides, roof, door and plurality of support feet; a plurality of lifting holes defined in the frame;

a plurality of support feet attached to the frame for supporting the container above the ground, each of the support feet having an opening defined in the support foot for receiving lifting items taken from the group consisting of: hooks, chains, straps and any combination of these; a plurality of tracks carried by the frame and arranged within the interior of the container and having attachment points removable attached to the tracks used for securing construction items to the interior of the container; a transparent roof portion included in the roof for allowing natural light to penetrate into the interior of the container; a plurality of stems carried by the roof used for lifting the container; a plurality of shelves attached to one side of the interior of the container having a predetermined length determined by standard construction material lengths for receiving and carrying construction material take from the group consisting of: plumbing, pipes, conduit, gutters, wiring, moulding and any combination of these; a lock carried by the door for securing the construction materials within the container to help prevent unauthorized access.

The invention can include an electronic lock attached to the door and a transceiver in electronic communications with the electronic lock for sending and receiving information from a remote site so that a lock combination can be reset from the remote location by transmitting a reset lock command to the electronic lock and unlocking the lock by transmitting an unlock command from the remote location. A GPS can be carried by the container for receiving GPS information from orbiting satellites; a transmitter in electronic communications with the GPS for receiving location information from the GPS and transmitting the location information to a remote location. A receiver can be in electronic communications with the transmitter for receiving a location request command from the remote location and actuating the transmitter to send location information to the remote location.

Alarm sensors taken from the group consisting of: foil, wires, proximity, heat, lock, motion and any combination of these. The alarm sensor can be in electronic communications with a transmitter so that the alarm sensor can transmit alarm information to a remote location. A solar panel in electronic communications with a power supply in electronic communications with the alarm sensors to power the alarm sensor can be included.

A tractor trailer can transport a plurality of containers and have a plurality of precut holes included in the floor of the trailer for receiving support feet of the containers. A forklift can be carried by the trailer for removing and replacing containers to and from the trailer. A crane carried by the trailer for removing and replacing container to and from the trailer.

Construction tools can be stored and arranged in the interior of the container taken from the group consisting of: pipe wrenches, thread chaser, flaring tools, thread seal tape, pipe clamp, pipe snake, propane torch, tongue-and-groove pliers, hacksaw, metal file, basin wrench, adjustable wrench, tubing cutter, fire-resistant cloth, safety glasses, dust mask, tape measure, pencil, level, drop cloth, ladder, caulk and or wood putty, hammer, finishing nails, power drill, bits, pneumatic nail gun, nail set, c-clamp, sandpaper, circular saw, screwdrivers and nut drivers, wire strippers, fishing tools, measuring devices, labeling machines, power drills and drivers, hammer/drills, power saws and any combination of these.

DESCRIPTION OF THE INVENTION

This invention is directed to specialized containers for the delivery of construction supplies to a job site. In one embodiment, specific-sized containers exist for delivering millwork products and mechanical, electrical and plumbing ("MEP") products. In one embodiment, the container would be a standard sized container such as used in shipping including the 20, 40, 45 and 48 foot in length variety with a width of about 8 feet and height between 6 and 12 feet. In one embodiment, the container can be between 4 and 10 feet wide, between 12 and 20 feet long, and 6 and 12 feet high. The container would be of an appropriate size to be transported on a semi-trailer truck such as a cargo trailer having two rear axles. The cargo trailer can use a king pin carried by a horseshoe-shaped quick-release coupling device (fifth wheel or a turntable hitch) at the rear of the towing engine that allows easy hook up and release. In this arrangement, the trailer cannot move by itself because it only has wheels at the rear end, hence the name semi-trailer. A semi-trailer a forward axle, provided by the towing engine, to carry half the load weight. Typically, a semi-trailer is equipped with landing gear 51 (FIG. 9) which include legs that can be lowered to support it when it is uncoupled. This allows the towing engine to be used for multiple trailers so that the trailer itself can be left at various locations including construction or job sites.

Figure 1:
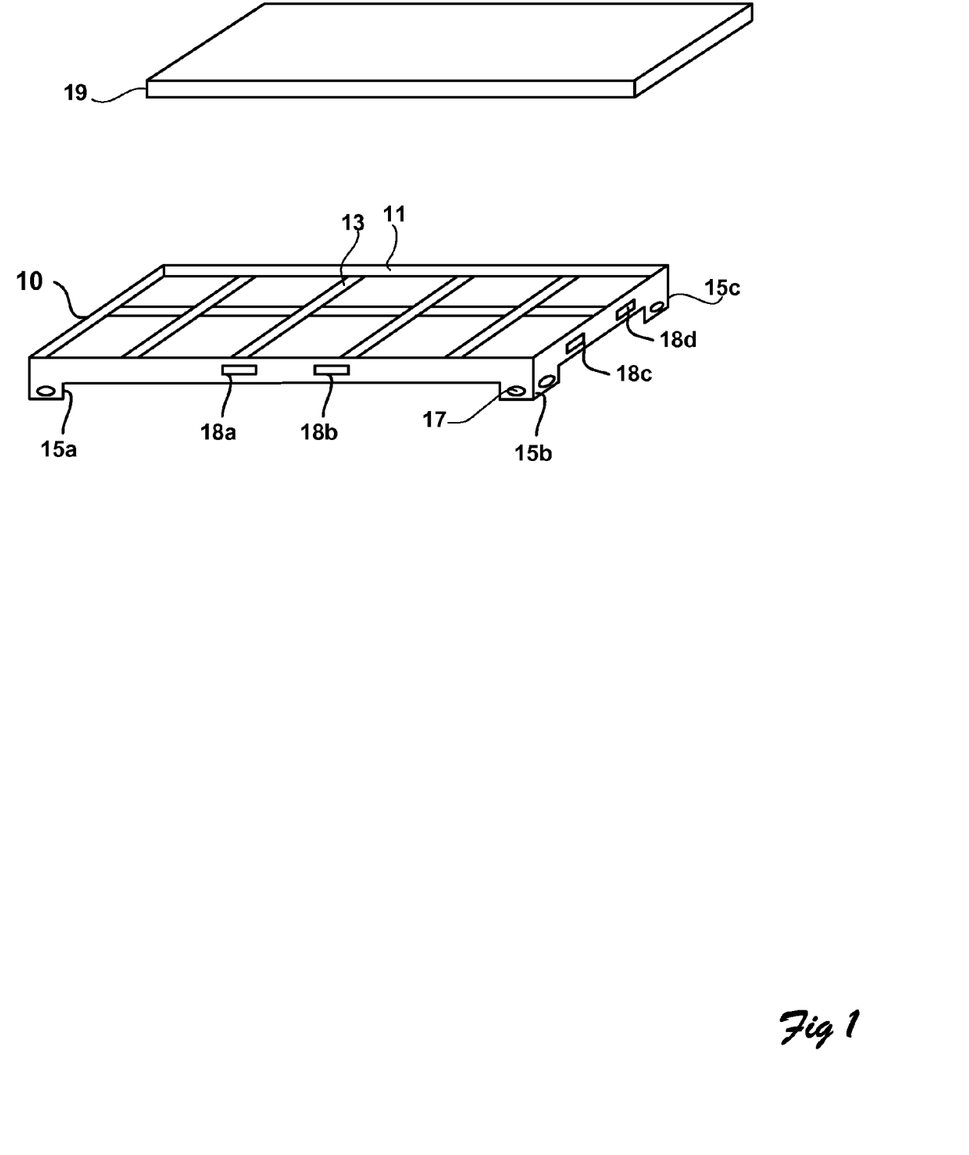
FIG. 1 is a perspective of components of the invention.

Referring to FIG. 1, in one embodiment, frame 10 includes a perimeter 11 and bottom support grid 13 having slats. In one embodiment, the frame is manufactured from metal such as steel and can include a solid steel bottom. The frame can have predetermined lifting holes 18a through 18d on all four sides for loading/offloading by a forklift, crane and the like. The forks of the forklift would be received in the lifting holes to lift the container for moving and placing the container where desired. This is particularly beneficial when multiple containers are placed on a trailer such as in the configuration with multiple containers shown in FIGS. 6 and 7. The lifting holes receive the forks of the fork lift and allow the container to be moved and otherwise manipulated. Offloading can be performed using a forklift 48 (FIG. 9) such as the 6,500# moffett lift or crane boom 50 outfitted with forks, lifting straps, hooks and the like.

The platform can include support feet 15a through 15c which can be an planar configuration, angled configuration, partial square configuration, square configuration or solid configuration. A support foot can include a foot opening 17 that can be used to secure the container to a trailer, secure the container to other containers, receive hooks or straps for lifting or securing the container to a anchor affixed to a physical location where the container is placed.

Figure 2:
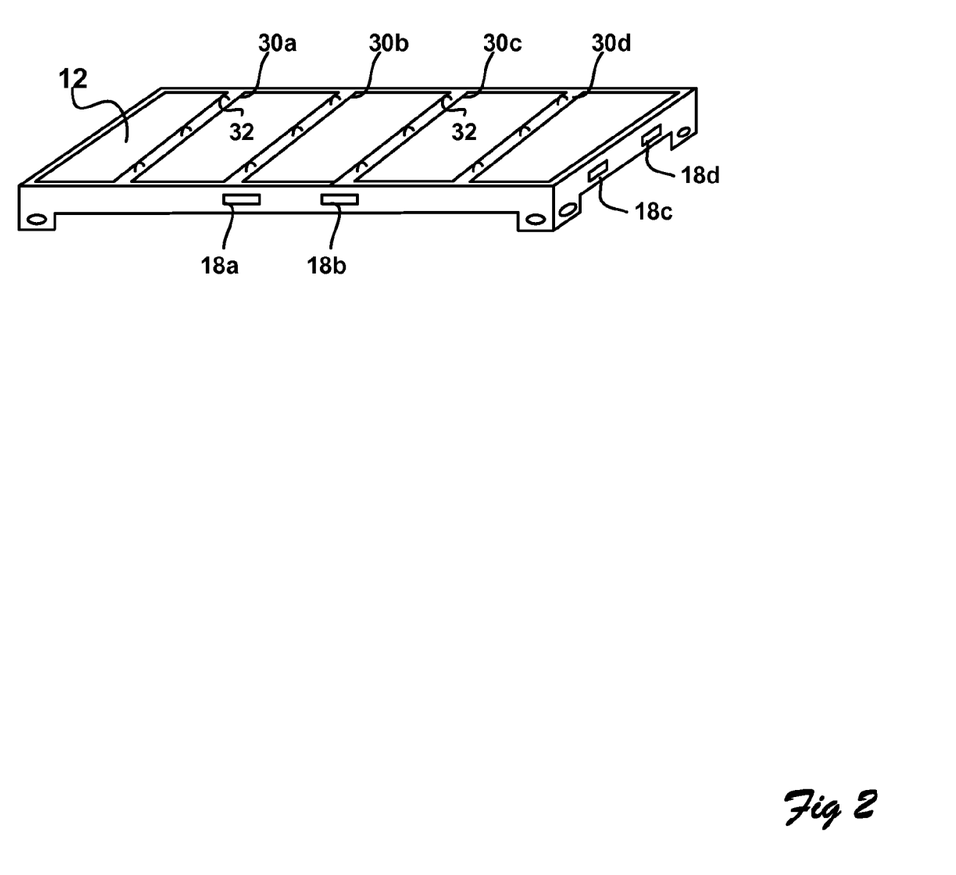
FIG. 2 is a perspective of components of the invention.

In one embodiment, a floor panel 19 can be received by the frame and supported by the frame to provide a floor to the container. The bottom support grid can provide additional support to the floor panel. Referring to FIG. 2, the grid and frame can receive a wood floor 12. To prevent construction materials and tools from shifting during transport, the wood floor can have tracks 30a through 30d spaced at predetermined locations along the floor. Attachment point 32 can be included in a track for securing items to the floor. In one embodiment, the floor include a plurality of inserts that are carried by the grid wherein the tracks are carried by the grid and protrude upwards to allow for items to be tied down using attachment points 32. In one embodiment, the attachment points are taken from the group consisting of loops, hooks, rings, snaps, and the like. In one embodiment, the tracks, including the attachments points, are recessed below the floor surface. In one embodiment, the attachments points are removable attached to the grid, tracks or floor so that the attachments can be moved, changed or removed entirely. An attachment cover can be included which covers the opening in the tracks that receives the attachment point.

Figure 3:
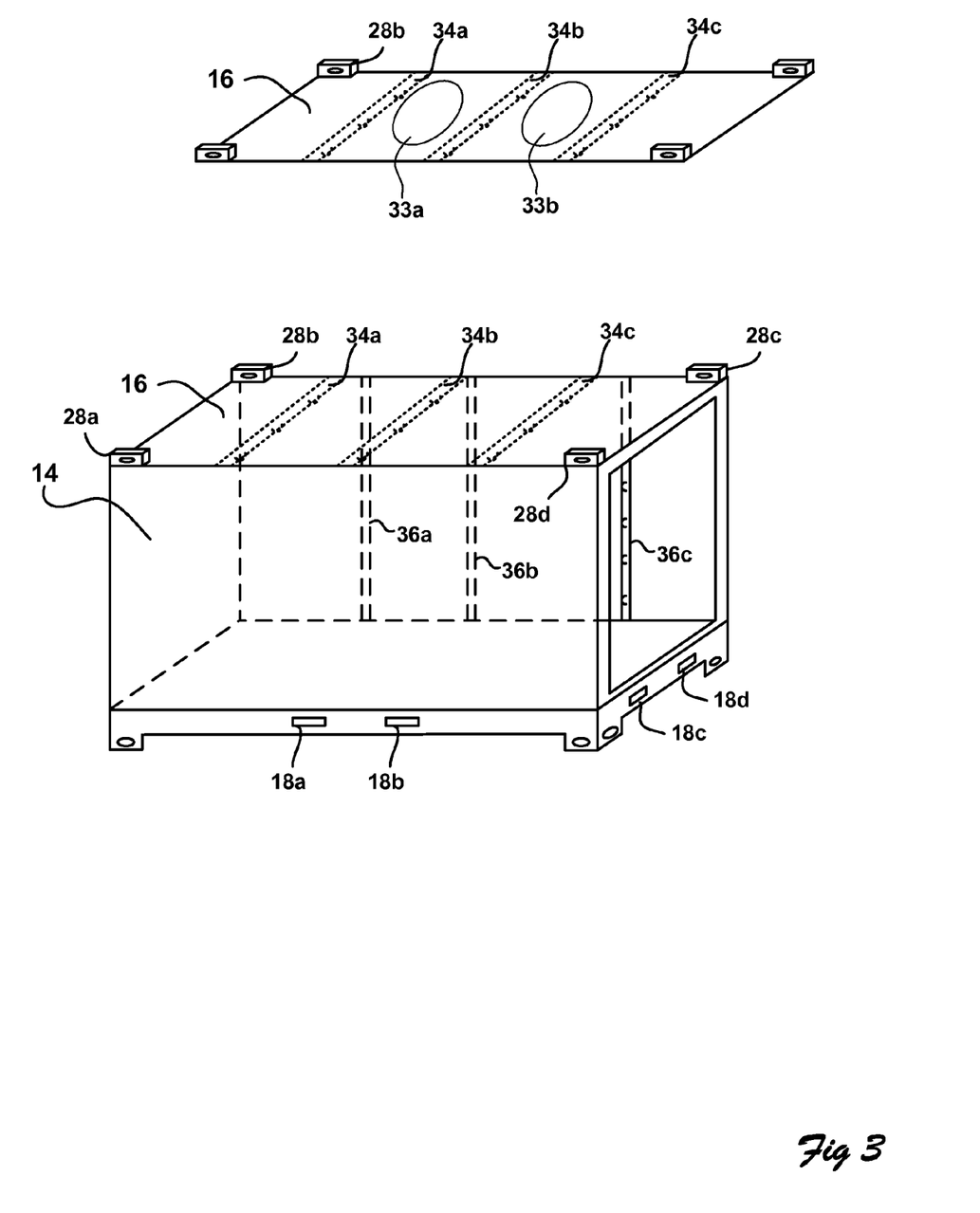
FIG. 3 is a perspective of components of the invention.

Referring to FIG. 3, walls 14 are carried by the frame. The sides themselves can be made from material taken from the group consisting of metal, stainless steel, fiberglass, wood, synthetics and the like. A roof 16 is carried by the walls and can be a semi-transparent or transparent material allowing light to penetrate the interior of the container eliminating the need for an artificial light source as well as reducing the weight of the container over traditional solid metal containers. In one embodiment, a portion of the roof is semi-transparent or transparent reducing the need for artificial light, while also providing opaque materials for structural support and attachment points. The semi-transparent or transparent portion can be of any shape and can be carried by the opaque portion of the roof. For example, roof portions 33a and 33b can be semi-transparent or transparent while roof 16 could be opaque.

The ceiling can have tracks 34a through 34c spaced at predetermined locations with attachments for receiving tie-down poles, securing members, and the like. The top outside corners of the container can have lifting connections 28a through 28c for connecting chains, straps, etc. to the container to allow for loading and offloading by crane or other lifting device. The lifting connections can be stems with openings for receiving straps or hooks, loops, rings, and the like. In one embodiment, the vertical attachments can be carried by vertical support beams 36a through 36c to provide the ability to tie-down items to the side of the interior of the container. The attachment members can be removable secured to the vertical support beams or ceiling tracks.

Figure 4:
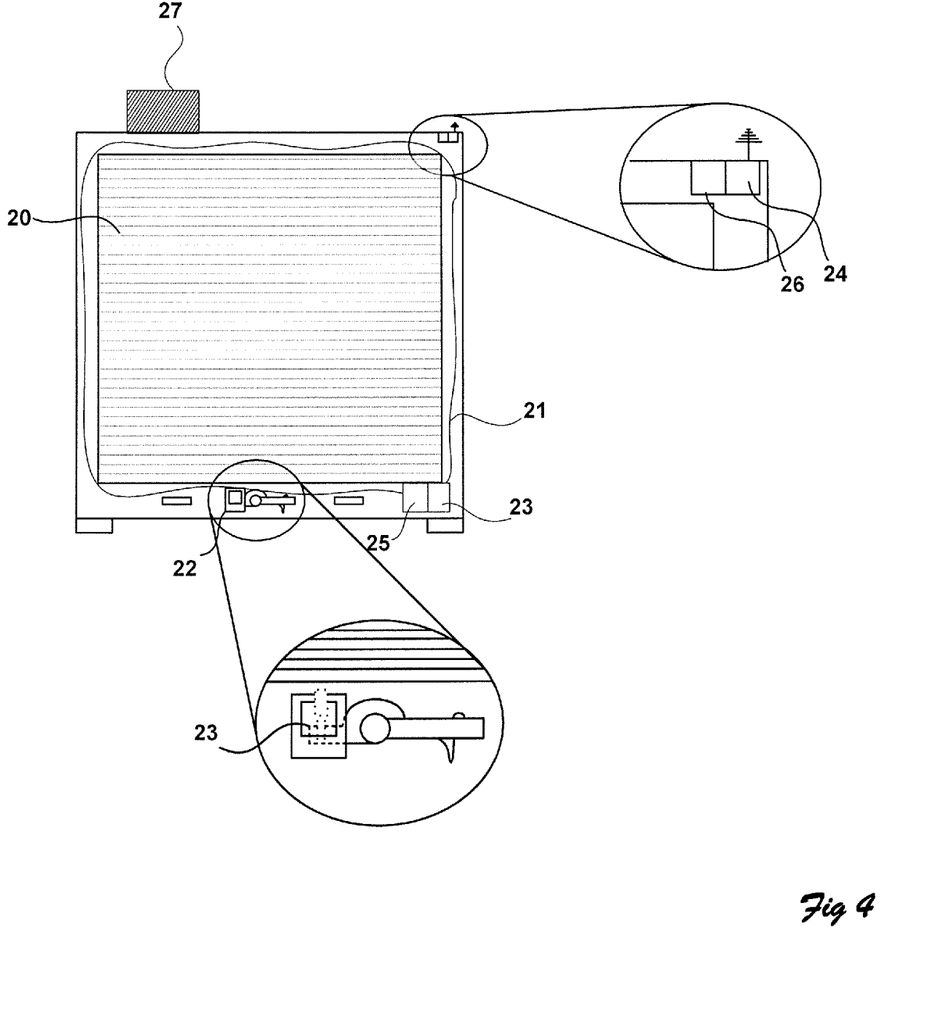
FIG. 4 is a side view with cutout view of the invention.

Referring to FIG. 4, a rear roll-up door 20 can be included as one side of the container. A lock 22 can be attached to the door to allow the door to be secured in a closed position. In one embodiment, the lock is electronic. In this embodiment, the electronic lock includes electromechanical member 23 that locks the handle in a closed position securing the door. Since the container is locked, the construction material and tools can be delivered at least one day before being installed in the construction cycle with minimal risk of loss. Further, a receiver 26 can be in electronic communications with the electronic lock so that combination or code reset information can be transmitted from a remote location to the container, thereby changing the lock, opening the lock or disallowing all access to the lock. The lock can include a sensor indicating whether the lock is opened or closed. A transmitter can be included with the receiver 26 so that the status of the lock can be transmitted to a remote location. A sensor can be included with the container that can determine the status of the lock, motion detection inside the sensor, proximity sensors to determine if anything is approaching the container, temperature, movement and the like. The information gathered from the sensor can be transmitted to a remote site when polled from the remote sight, in reaction to a trigger event such as the sensor detecting movement.

The container may contain a GPS tracking device 24 that can determine the container's present location as well as transit the location of the container to the remote site. The floor, sides and roof of the container can include penetration sensor device that can determine whether the floor, sides or roof has been breached. For example, wire 21 or other conductive material such as foil can be contained on or within the floor, sides or roof so that when the wire of foil is broken, a detector 23 can send an alarm can be transmitted to a remote site. Further, an alarm 25 can be included with the container that can be activated when certain events occur such as a breach attempt, the lock being opened, motion detected or even a low power supply that can be included with the transmitter 26, GPS 24 or separately included. The alarm can have an audio or visual signal and can have a delayed activation or silent activation. Solar panels 27 can be included in the roof or within the container (receiving light from the semi-transparent or transparent portions) to power the various electronic devices associated with the container. A heat sensor can be included for determining when the interior of the container reaches an undesirable level.

Figure 5:
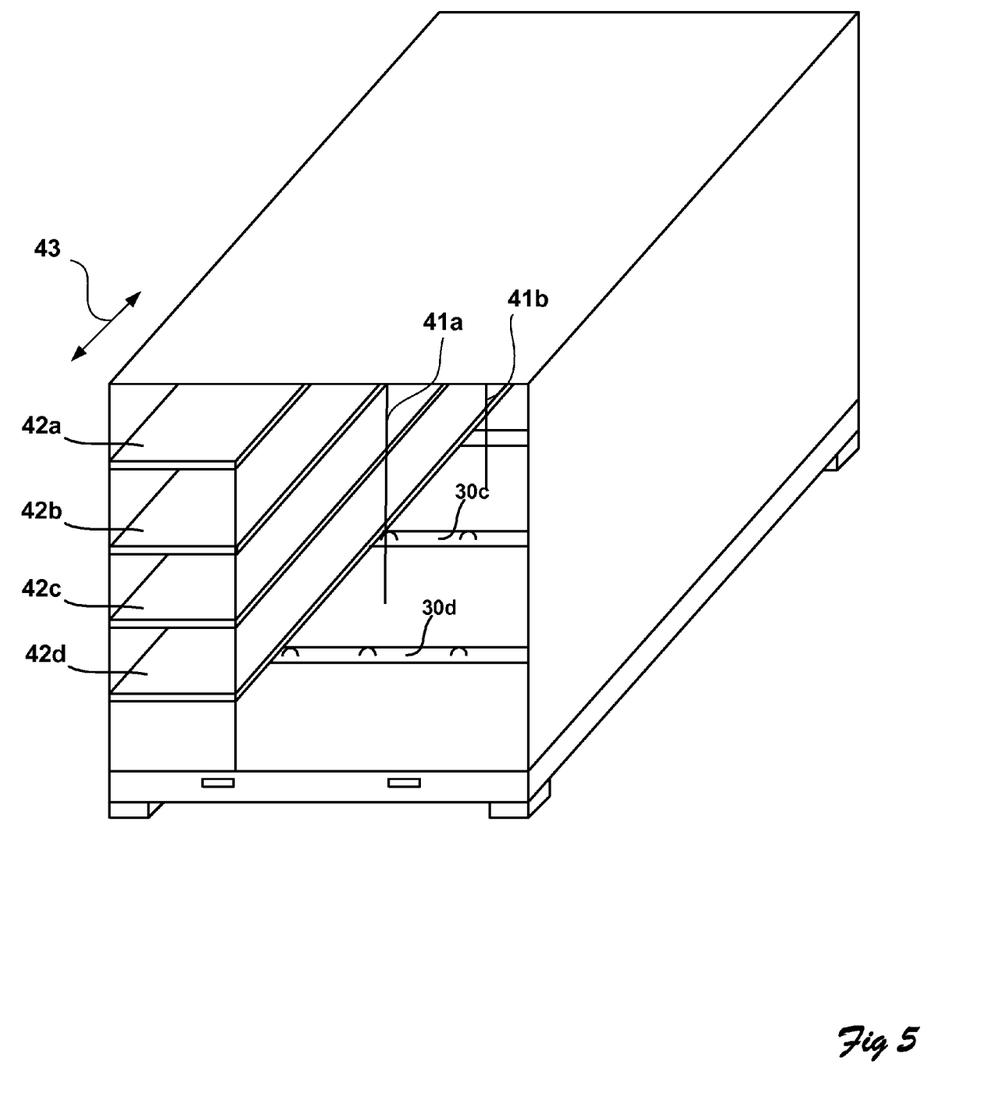
FIG. 5 is a perspective of components of the invention.

Referring to FIG. 5, one embodiment includes specifically sized shelves on the interior left side of the container. Shelves 42a through 42d are spaced at predetermined shelf depths that can span the entire length of the container at predetermined heights to secure long-length construction materials during transport. For example, moulding generally has a standard length of 8 feet. The container, if it is 9 feet in length, would accommodate sufficient moulding in eight foot sections for building a structure. Shelf support member 41a and 41b can both help support the shelves as well as function as a barrier to prevent the moulding from falling off the shelves. With the door opened, the moulding can be moved in a direction shown as 43 to place and remove moulding from the shelves in the container. Further, the securing attachments on the floor and roof can be used to secure moulding in the shelves. If should be understood that while moulding has been used as an example, other construction material such as conduit, plumping, wiring, gutters, pipes and the like would be similarity manipulated, secured and arranged.

Figure 6:
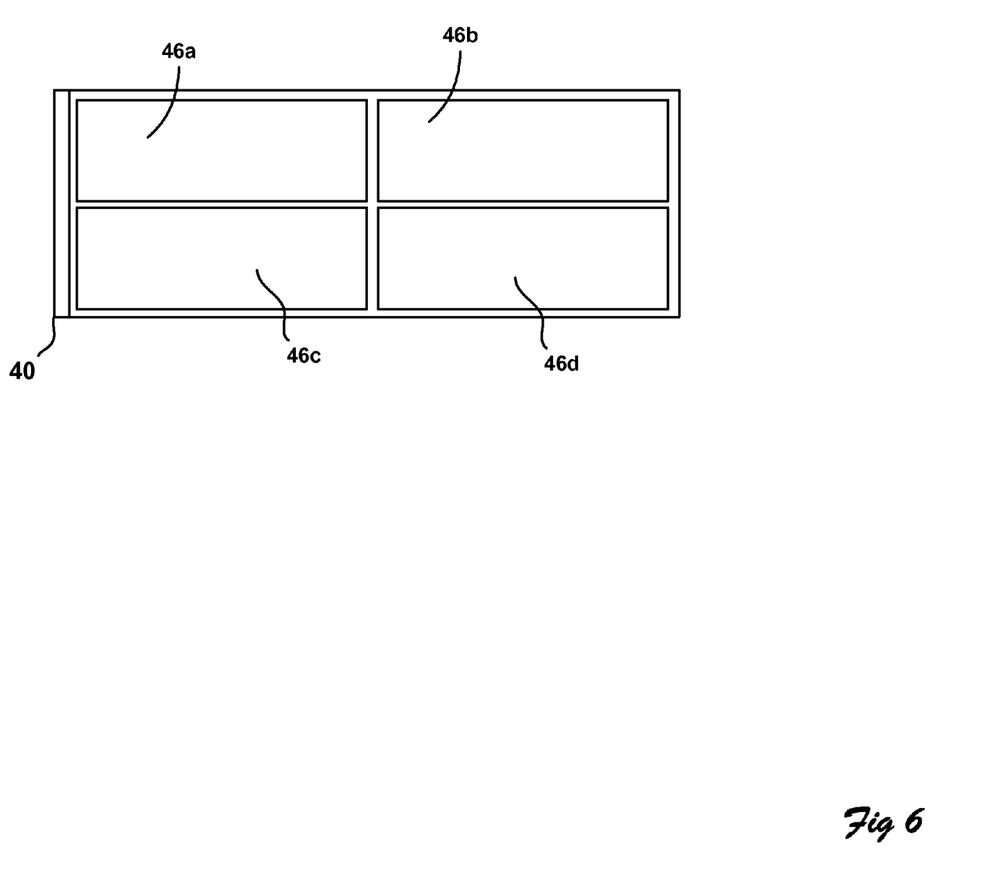
FIG. 6 is a top down view of components of the invention.
Figure 7:
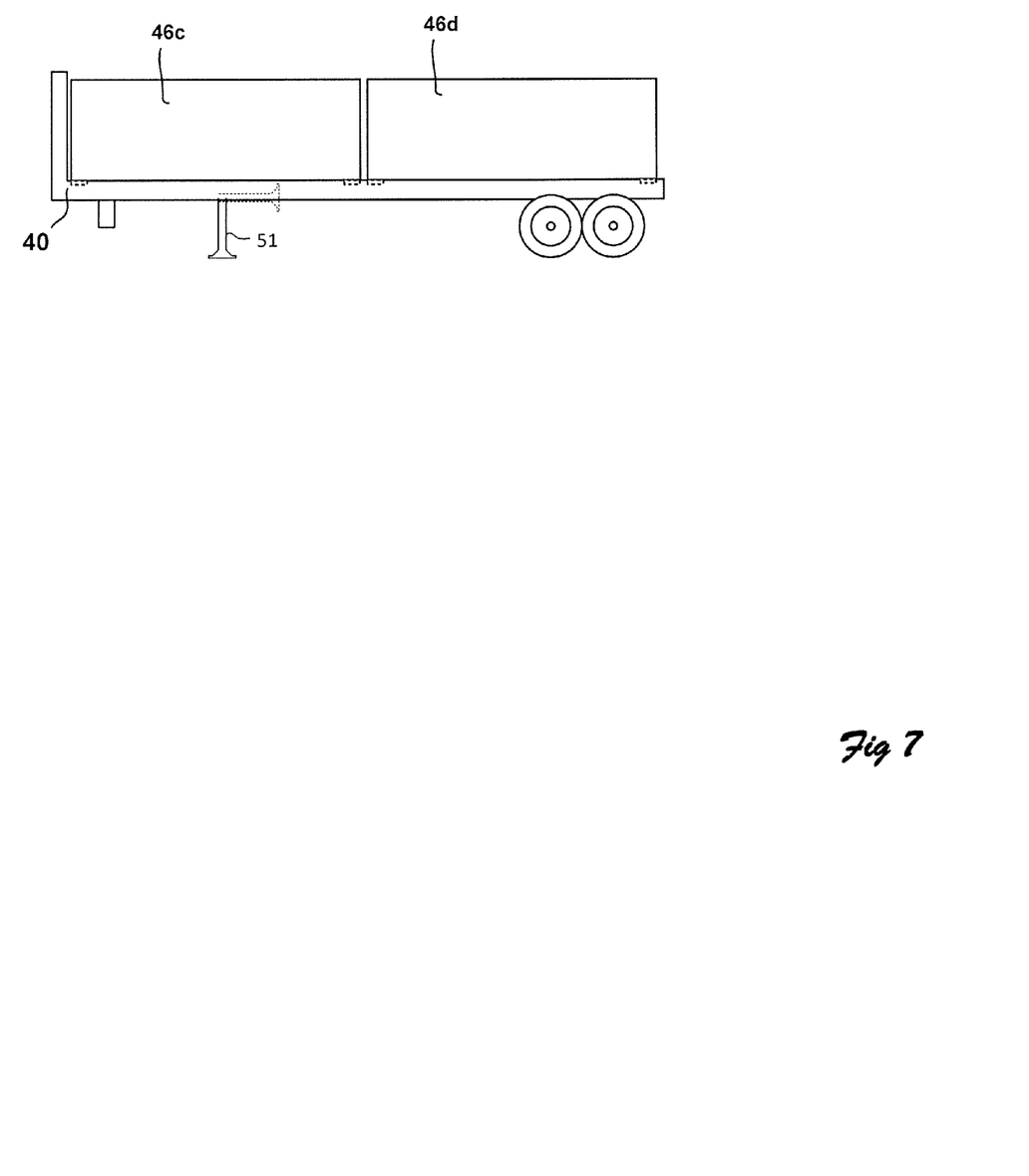
FIG. 7 is a side view of components of the invention.
Figure 8:
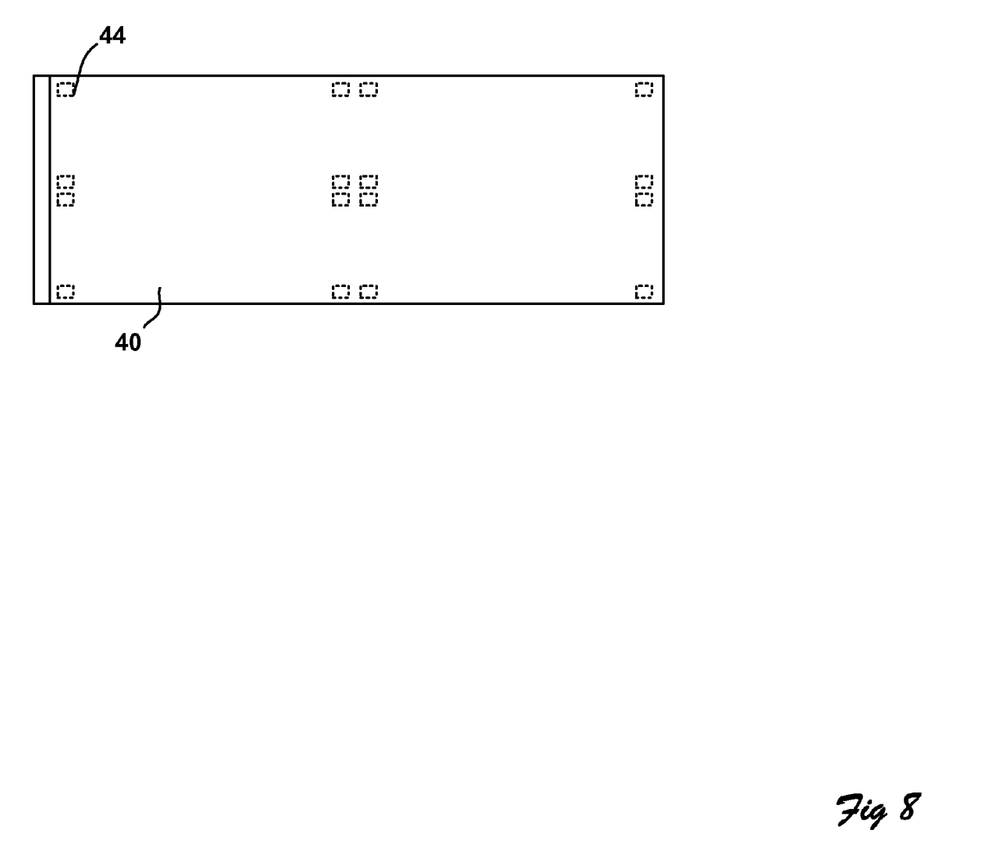
FIG. 8 is a top down view of components of the invention; and,
FIG. 9 is a side view of components of the invention.

Referring to FIGS. 6, 7 and 8, when transporting containers, a flatbed tractor trailer 40 can be used. In one embodiment, the tractor trailers will have a minimum deck height of 32 inches. Four containers 46a through 46d can be delivered by one tractor trailer so that a single tractor trailer dispatch, with one driver, can be used to deliver multiple containers to a job site or multiple job sites. The tractor trailer bed can be made from wood and include precut holes 44 for receiving the support feet of the container. This allows the containers to be placed in an identical position each time the container is loaded to eliminate the error of the container not being loaded in accordance with DOT regulations.

Prior to placement on the trailer for delivery to the construction site, the container is preloaded with construction materials in accordance with the particular job. For example, a residential home would include in a container load-out plumbing, gutters, conduit and moulding. Additionally, one container could include material for exterior work such as gutters while another container could include materials for interior work including moulding and plumbing. Tools can also be included in the container and can be taken from the group of: pipe wrenches, thread chaser, flaring tools, thread seal tape, pipe clamp, pipe snake, propane torch, tongue-and-groove pliers, hacksaw, metal file, basin wrench, adjustable wrench, tubing cutter, fire-resistant cloth, safety glasses, dust mask, tape measure, pencil, level, drop cloth, ladder, caulk and or wood putty, hammer, finishing nails, power drill, bits, pneumatic nail gun, nail set, c-clamp, sandpaper, circular saw, screwdrivers and nut drivers, wire strippers, fishing tools, measuring devices, labeling machines, power drills and drivers, hammer/drills, power saws and any combination of these.

In one embodiment, specifically for millwork, the container can be 18' L×4½' W and could range from 9'-12' H. Every 2' will have a metal track with holes to insert a tie-down pole. The ceiling will have the same bracing for the tie-down as the inside floor. Four shelves 10" wide on the inside left wall that span the entire length of the container and are placed at the following heights: 2', 4', 6' and 7½'. These shelves would be used to store mouldings for delivery.

In one embodiment, specifically for mechanical, electrical and plumbing (MEP Containers), dimensions could range from 12'-18' L×4½' W and could range from 8'-12' H. Every 2 feet a metal track with holes to insert a tie-down pole will be present on the floor. Four shelves 10" wide on the inside left wall can span the entire length of the container and are placed at the following heights: 2', 4', 6' and 7½'. These shelves would be used to store PVC pipe and any other long-length products.

Figure 9:
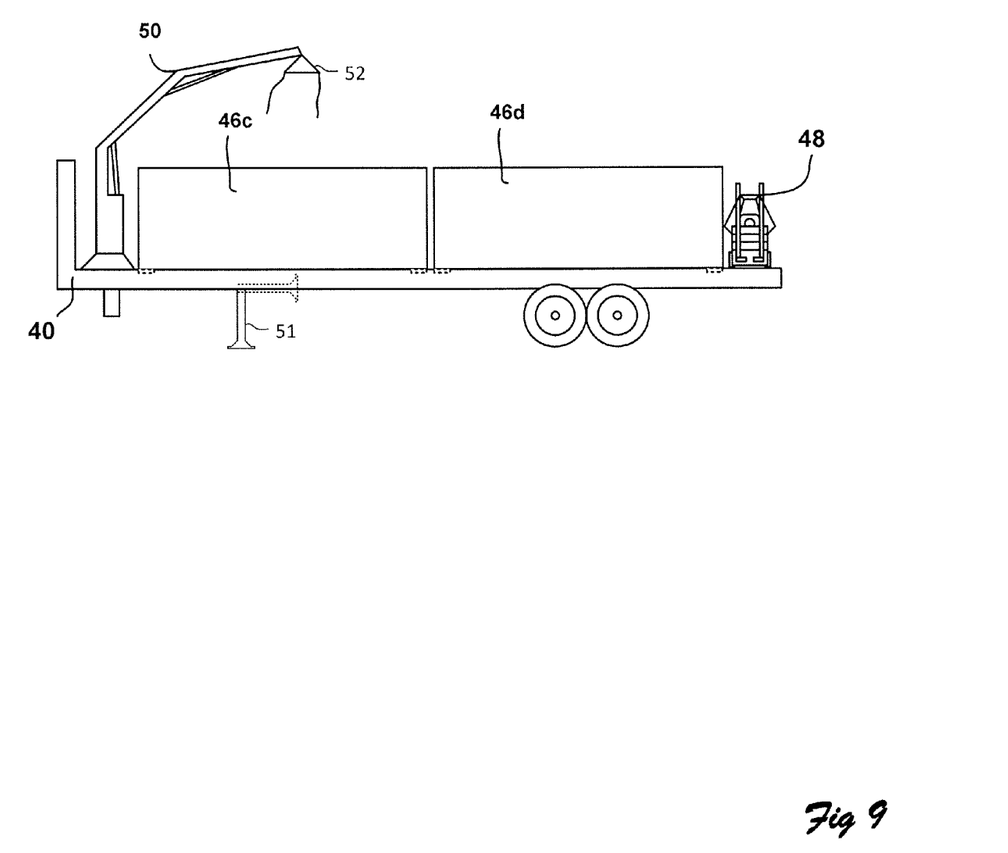

Referring to FIG. 9, a trailer carrying a plurality of containers is shown. The trailer can include a forklift 48 carried on the back of the trailer to facilitate the transportation, removal and loading of the container on and off the trailer. The forklift can be driven down an included ramp or can be stored on a lifting apparatus that allows the forklift to be raised and lowered onto and off of the trailer.

Further, a crane 50 of other similar lifting device can also be included with the trailer. A sling 52 or other lifting to attachment means can be used in cooperation with the crane and used to lift, remove or load containers on the trailer.

While a preferred embodiment of the invention has been described using specific terms, such description is for illustrative purposes only, and it is to be understood that changes and variations may be made without departing from the spirit or scope of the following claims.

What is claimed is:

1. A system for transporting, storing and securing construction materials for use at a job site comprising:
    a set of four containers each having a frame, sides, roof, door and plurality of support feet, said containers each having dimensions of a width between 4 and 4.5 feet, height between 6 and 12 feet and length between 18 and 20 feet so that said four containers can be placed on a tractor trailer in a 2×2 arrangement;
    said tractor trailer having a tractor trailer bed having a plurality of openings for receiving said support feet of each container wherein said support feet are attached to said frame for supporting each container above the ground, each of said support feet having an opening defined in the support foot for receiving lifting items taken from the group consisting of: hooks, chains, straps and any combination of these;
    a plurality of lifting holes defined in each said frame or each container;
    a plurality of tracks carried by said frames and arranged within the interior of each container and having attachment points removably attached to said tracks used for securing construction items to the interior of each container;
    a transparent roof portion included in said roof for allowing natural light to penetrate into said interior of each container;
    a plurality of stems carried by said roof used for lifting each container;
    a set of four shelves attached to one side of said interior of each container having a width between 8 and 10 inches and disposed at heights of 2, 4, 6 and 7½ feet for receiving and carrying construction material taken from the group consisting of: plumbing, pipes, conduit, gutters, wiring, moulding and any combination of these; and,
    a lock carried by said door for securing said construction materials within each container to help prevent unauthorized access.

2. The system of claim 1 including:
    an electronic lock attached to said door having an electromechanical member for locking and unlocking said lock; and,
    a transceiver in electronic communications with said electronic lock for sending and receiving information from a remote site so that a lock combination can be reset from said remote location by transmitting a reset lock command to said electronic lock and unlocking said lock by transmitting an unlock command from said remote location.

3. The system of claim 1 including:
    a GPS receiver for receiving GPS information from orbiting satellites attached to said container; and,
    a transmitter in electronic communications with said GPS receiver for receiving location information from said GPS and transmitting said location information to a remote location.

4. The system of claim 3 including a communications receiver in electronic communications with said transmitter for receiving a location request command from said remote location and actuating said transmitter to send location information to said remote location.

5. The system of claim 1 including alarm sensors taken from the group consisting of: foil, wires, proximity, heat, lock, temperature and any combination of these.

6. The system of claim 5 wherein said alarm sensor is in electronic communications with a transmitter so that said alarm sensor can transmit alarm information to a remote location.

7. The system of claim 5 including a solar panel in electronic communications with a power supply in electronic communications with said alarm sensors to power said alarm sensor.

8. The system of claim 1 including a forklift carried by said trailer for removing and replacing containers to and from said trailer.

9. The system of claim 1 including a crane carried by said trailer for removing and replacing container to and from said trailer.

10. The system of claim 1 including construction tools arranged in the interior of said container taken from the group consisting of: pipe wrenches, thread chaser, flaring tools, thread seal tape, pipe clamp, pipe snake, propane torch, tongue-and-groove pliers, hacksaw, metal file, basin wrench, adjustable wrench, tubing cutter, fire-resistant cloth, safety glasses, dust mask, tape measure, pencil, level, drop cloth, ladder, caulk and or wood putty, hammer, finishing nails, power drill, bits, pneumatic nail gun, nail set, c-clamp, sandpaper, circular saw, screwdrivers and nut drivers, wire strippers, fishing tools, measuring devices, labeling machines, power drills and drivers, hammer/drills, power saws and any combination of these.

11. The system of claim 1 wherein said transparent roof portion is semi-transparent.

* * * * *